United States Patent
Wett

(10) Patent No.: US 7,846,334 B2
(45) Date of Patent: Dec. 7, 2010

(54) METHOD FOR THE TREATMENT OF AMMONIA-CONTAINING WASTE WATER

(75) Inventor: Bernhard Wett, Innsbruck (AT)

(73) Assignee: Universität Innsbruck Institut für Umwelttechnik, Innsbruck (AT)

( * ) Notice: Subject to any disclaimer, the term of this patent is extended or adjusted under 35 U.S.C. 154(b) by 257 days.

(21) Appl. No.: 11/991,927

(22) PCT Filed: Sep. 20, 2006

(86) PCT No.: PCT/AT2006/000384

§ 371 (c)(1),
(2), (4) Date: Nov. 20, 2008

(87) PCT Pub. No.: WO2007/033393

PCT Pub. Date: Mar. 29, 2007

(65) Prior Publication Data

US 2009/0272690 A1    Nov. 5, 2009

(30) Foreign Application Priority Data

Sep. 20, 2005 (AT) .............................. A 1550/2005

(51) Int. Cl.
*C02F 3/00* (2006.01)
(52) U.S. Cl. ...................................... 210/620; 210/743
(58) Field of Classification Search ......... 210/620–628, 210/743, 758
See application file for complete search history.

(56) References Cited

U.S. PATENT DOCUMENTS

| 4,537,682 | A | 8/1985 | Wong-Chong |
| 5,160,621 | A | 11/1992 | Nagasaki et al. |
| 5,863,435 | A | 1/1999 | Heijnen |
| 6,383,390 | B1 | 5/2002 | Van Loosdrecht et al. |
| 6,485,646 | B1 * | 11/2002 | Dijkman et al. ............. 210/610 |
| 7,494,588 | B2 * | 2/2009 | Nakamura et al. .......... 210/614 |

FOREIGN PATENT DOCUMENTS

| EP | 0751098 | 6/1996 |
| WO | 00/05176 | 2/2000 |

\* cited by examiner

*Primary Examiner*—Chester T Barry
(74) *Attorney, Agent, or Firm*—Dykema Gossett PLLC

(57) ABSTRACT

A method for treating ammonium-containing waste water by means of a single sludge system in an SBR reactor, in which ammonium is converted to nitrite in a first reaction and ammonium and nitrite are converted into molecular nitrogen in a second reaction carried out in parallel, the oxygen concentration in the reactor being maintained at a low level. A robust process is achieved by providing that the pH-value of the system is controlled and kept at a target value by controlled intermittent aeration, the fluctuation range of the pH-value amounting to 0.05 at most, and preferably 0.02 at most, and the O2-concentration being kept between 0.2 mg/l and 0.4 mg/l, and preferably between 0.25 mg/l and 0.35 mg/l.

8 Claims, 3 Drawing Sheets

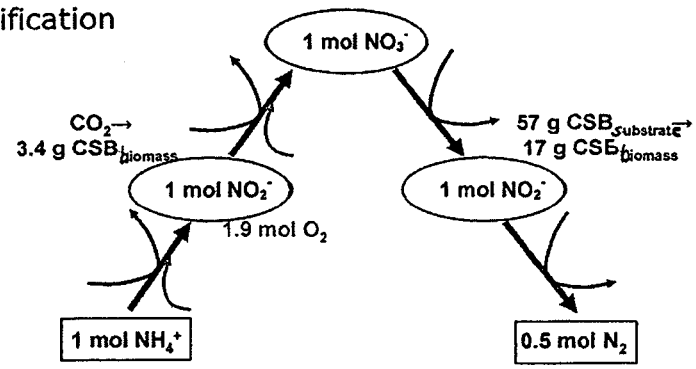
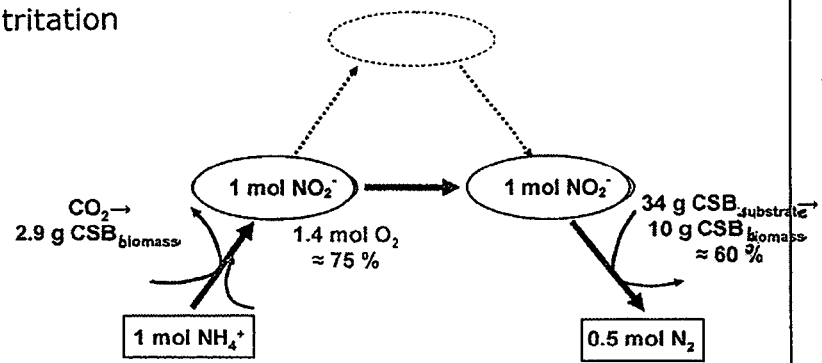
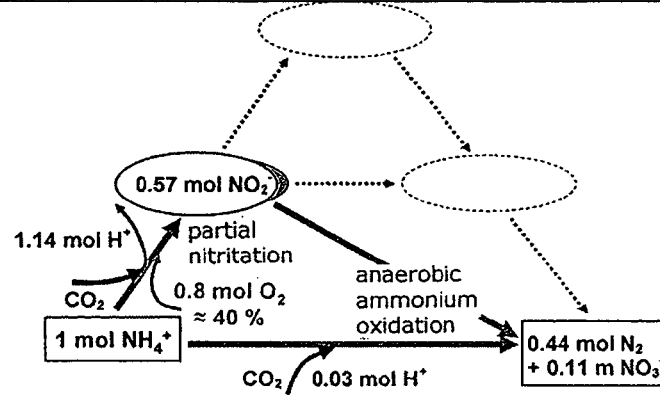

METHOD FOR THE TREATMENT OF AMMONIA-CONTAINING WASTE WATER

The invention relates to a method for treating ammonium-containing waste water by means of a single sludge system in an SBR reactor, in which ammonium is converted into nitrite in a first reaction, and ammonium and nitrite are converted into molecular nitrogen in a second reaction carried out in parallel, the oxygen concentration in the reactor being kept at a low level.

In conventional sewage plants ammonium is converted to nitrogen by executing two oxidation steps, in which nitrogen is first converted to nitrite and subsequently to nitrate (nitrification), whereupon the generated nitrates are reduced in a two-step reduction process first to nitrite and subsequently to molecular nitrogen (denitrification). Depending on the process method employed nitrification and denitrification may be performed in the same reactor one after the other, or they may be carried out in different reactors.

It is known that instead of complete nitrification and denitrification it is preferable from the point of view of energy effectiveness to use a process in which the initially generated nitrite is not further oxidized to nitrate but is directly reduced to nitrogen. Nitritation and denitritation thus occur either alternatingly or simultaneously. The difficulty in this energy-efficient nitrogen metabolism lies in a stable suppression of the second oxidation step from nitrite to nitrate. Under conditions prevailing in sewage plants for the treatment of "normal" waste water, i.e. communal or industrial waste water, nitrite oxidating micro-organisms show higher growth and reaction rates than ammonium oxidating micro-organisms. For this reason nitrite will hardly occur as an intermediate product. High temperatures, high ammonia concentrations and low oxygen concentrations are however factors influencing the prevalence of the first oxidation step over the second. Such methods, and also the method of the present invention, are therefore primarily suited for the biological treatment of waste water with high ammonium content, such as process water, landfill seepage or liquid manure from pig farms. Waste water of this type has high ammonium concentration and in general occurs at relatively high temperatures.

In EP 0 826 639 A a method is described which largely avoids the second oxidation step. In a chemostat, that is a reactor without sludge retention, the sludge age is adjusted in such a way that ammonium oxidating micro-organisms still can thrive while nitrite oxidating micro-organisms are flushed out.

By further modification the process described above may be improved to be even more energy-efficient. Part of the ammonium is oxidated to nitrite and the remaining part is converted to nitrogen using the generated nitrite. In the literature this process is known as anammox process.

From U.S. Pat. No. 6,383,390 a method is known which uses this energy-efficient reaction path. The partial nitritation is carried out in a first reactor and subsequently the conversion to nitrogen by anammox micro-organisms is carried out in a second reactor.

From WO 00/05176 it is also known to have both reactions occur simultaneously in one and the same reactor.

It is a common feature of all known methods that no reliable industrial-scale implementation has been documented yet. The reason for this lies in the fact that micro-organisms which oxidate ammonium anaerobically (or reduce nitrite auto-trophically) are irreversibly inhibited already by relatively low nitrite concentrations. Due to the extremely low growth rate of these micro-organisms even relatively small fluctuations in the conditions of reaction may cause grave disturbances of the process. Lowering the oxygen content as such will not solve these problems either.

It is provided by the invention that the pH-value of the system is controlled and kept at a target value by controlled intermittent aeration, the fluctuation range of the pH-value amounting to 0.05 at most, and preferably 0.02 at most, and the $O_2$-concentration being kept between 0.2 mg/l and 0.4 mg/l, and preferably between 0.25 mg/l and 0.35 mg/l.

It is well known that the pH-value may be influenced by aeration, i.e. that the pH-value may be controlled by making aeration dependent on the pH-value. EP 0 872 451 B describes this for instance for a process differing from the process of the invention.

Essential for the invention is the finding that the pH-value must be controlled within a very narrow range, and that at the same time the oxygen concentration must be kept at a low and narrowly defined level, and that it is furthermore necessary that aeration be intermittent. This will cause nitrite formation to dominate over nitrite reduction during the aeration interval, while nitrite reduction predominates during the aeration pause. Since a release of $H^+$-ions (FIG. 1c) accompanies nitrite formation and binding of $H^+$-ions goes with nitrite reduction, the maximum nitrite concentration in the reactor can be determined by adjusting the pH-control interval. By choosing a low limiting value for oxygen during the aeration interval simultaneous nitrite reduction is possible and too frequent on/off switching of aeration is avoided.

Surprisingly it has been found that under the conditions described above a stable process may be achieved in which degradations due to the inhibition of anaerobic ammonium oxidizers by nitrite are largely avoided. The system is robust under fluctuations of the ammonium content of the inflowing waste water. As mentioned above, the method is carried out as a single-step process, i.e. a single sludge system in an SBR-plant. In comparison with conventional nitrification/denitrification methods the amount of oxygen required for converting ammonium to nitrogen may be reduced stoichiometrically by 60%. The required amount of organic carbon can even be reduced by roughly 90%.

It is of particular advantage if the reaction phase is followed by an ammonia removal phase, in which the pH-value is lowered. During the reaction phase the ammonia concentration should be as high as possible, i.e. a high ammonium concentration should be present at a relatively high pH-value of about 7.3. This will inhibit nitrite oxidation. On the other hand the ammonium concentration in the outflow of treated waste water should be as low as possible. This can be achieved by lowering the pH-value in a subsequent ammonia removal phase, in which a pH-value lowered by 0.1 to 0.3 is set. The available alkalinity will thus be used for nitrification. The duration of the ammonia removal phase may amount to approximately 5% to 25% of the duration of the reaction phase.

Alternatively an ammonia removal phase may follow the reaction phase, in which coarse bubble aeration is provided without changing the pH control interval. In this way stripping of $CO_2$ is intensified, whereby the available alkalinity is also employed for nitrification.

Especially high reaction rates may be achieved by setting the target value of the pH-value, depending on the oxygen transfer efficiency OTE, within a range defined by the equation $$pH_s = 7.55 - 3*OTE/100 \pm 0.05.$$

Oxygen transfer efficiency OTE is here given as a percentage. Its value is for instance dependent on the geometry of the reactor used; for shallow reactors it is typically at about 10%.

In this case the above formula gives an optimum target value for the pH-value of 7.25 with a fluctuation range of 0.1, i.e. an interval from 7.2 to 7.3. For higher reactors OTE may be about 20%. In this case the computed pH-value of 6.95 will preferably be set only during the ammonia removal phase.

Since foaming has presented a problem in the treatment of highly concentrated waste water it has been found to be of advantage in the present invention to feed in a constant amount of incoming waste water above the water level and to distribute it over as large an area as possible, thereby reducing foam already formed. To this end sprinkling devices and distribution of the water via input nozzles and deflecting baffles can be used.

To obtain a stable population of slowly growing anaerobic ammonium oxidizers a sludge age of at least 20 days should be aimed at. Sufficient sludge retention must be guaranteed by the use of immersed walls, folding dams, clear water drains near the surface, or membranes. At the same time sludge dry substance should not rise too high (not above 10 g dry substance/l) to avoid a significant drop in oxygen input efficiency. This means that the amount of excess sludge removed (or sludge settling time in an SBR without excess sludge removal) should be chosen such that a maximum sludge age of 35 days will be realised.

The invention will now be explained in more detail in the context of the enclosed drawings.

FIGS. 1$a$,1$b$,1$c$ are diagrams exhibiting the mass balance of diverse purification systems;

FIG. 1$a$ shows a conventional nitrification/denitrification process, in which, as described above, ammonium is first oxidized to nitrite and subsequently to nitrate, which is reduced in a first reducing step to nitrite and in a second reducing step to nitrogen. It can be seen that per mol of processed ammonium 1.9 mol oxygen and a considerable amount of organic carbon are required.

FIG. 1$b$ shows a method in which nitrate formation is suppressed, thus limiting the required amount of oxygen to 1.4 mol oxygen per mol ammonium. Besides, the required amount of carbon is less than in the method of FIG. 1$a$.

FIG. 1$c$ shows the reaction on which the method of the invention is based. In this method only partial nitritation is carried out in parallel with the autotrophic reduction of the nitrite formed. The required amount of oxygen is lowered to approximately 0.8 mol oxygen per mol ammonium. The process is summarily described by the following reaction equation, with unavoidable side reactions included:

$$NH_4^+ + 1.32\ NO_2^- + 0.066\ HCO_3^- + 0.13\ H^+ \rightarrow$$

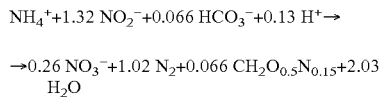

$$\rightarrow 0.26\ NO_3^- + 1.02\ N_2 + 0.066\ CH_2O_{0.5}N_{0.15} + 2.03\ H_2O$$

According to this reaction equation the anaerobic autotrophic ammonium oxidation with nitrite requires a preceding aerobic autotrophic oxidation of at least 57% of total ammonium, in order to remove it. The difficulty encountered in developing the present system lay in the transition from a known and widely used nitritation/denitritation system, i.e. from a system which essentially needs organic carbon as an additive and works with heterotrophic biomass, to a system with slowly growing autotrophic biomass. During development of the system a multi-step transition from laboratory scale to large industrial scale was performed. Starting with 4 liters of inoculum from a pilot plant, a 300 liter reactor was inoculated. Reactor size was then enlarged in steps of one or two orders of magnitude to a final size of 500 m$^3$. In each step enriching the biomass was a highly sensitive process, until a robust process could be attained after reaching a critical mass, which then was used as inoculum for the next reactor.

Figure 2:
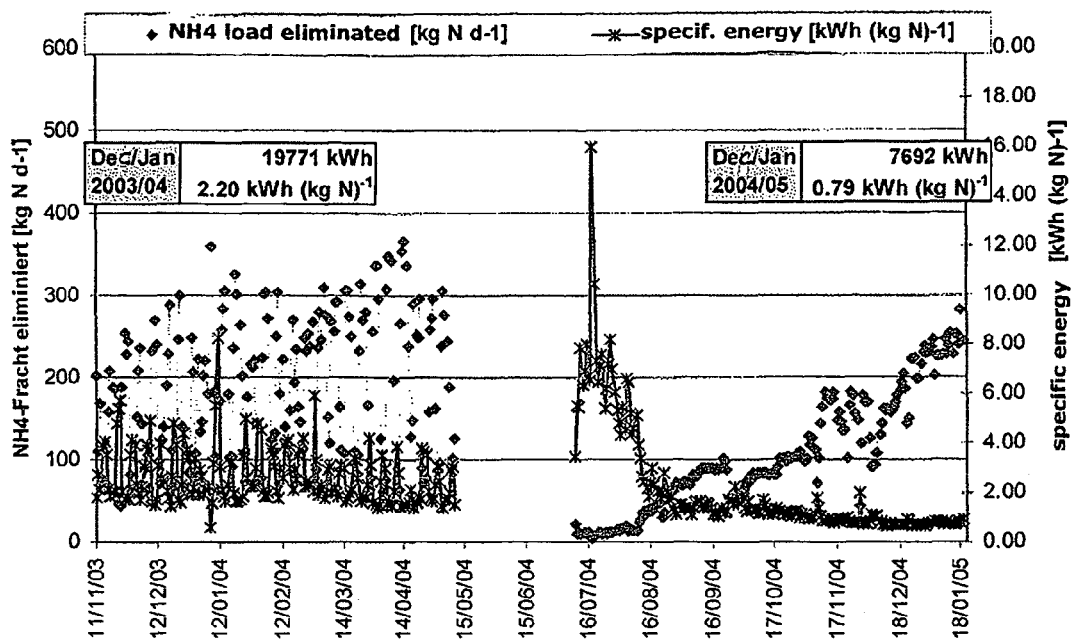
FIG. 2 is a diagram explaining the efficiency of the method according to the invention.

FIG. 2 shows a diagram in which the amount of ammonium converted per day (in kg nitrogen per day) is plotted over time. At the same time the specific energy input in kilowatt-hours per kg nitrogen is shown.

The diagram shows that in a first period of time between Nov. 11, 2003 and May 15, 2004, i.e. in a period prior to the inoculation of the system, the amount of ammonium converted per day was between 200 kg and 300 kg nitrogen in the majority of days. Specific energy input in this period with nitritation/denitritation (FIG. 1$b$) was 2.2 kWh/kg nitrogen on the average. On the righthand side of the diagram the measured values after inoculation are plotted for the time period between Jul. 16, 2004 and Jan. 18, 2005. As can be observed ammonium conversion after very low initial values once more rose to 250 kg nitrogen per day. At the same time energy input dropped from high initial values to a final value of 0.79 kWh/kg nitrogen. Energy input has thus decreased to roughly one third of the initial value.

Figure 3:
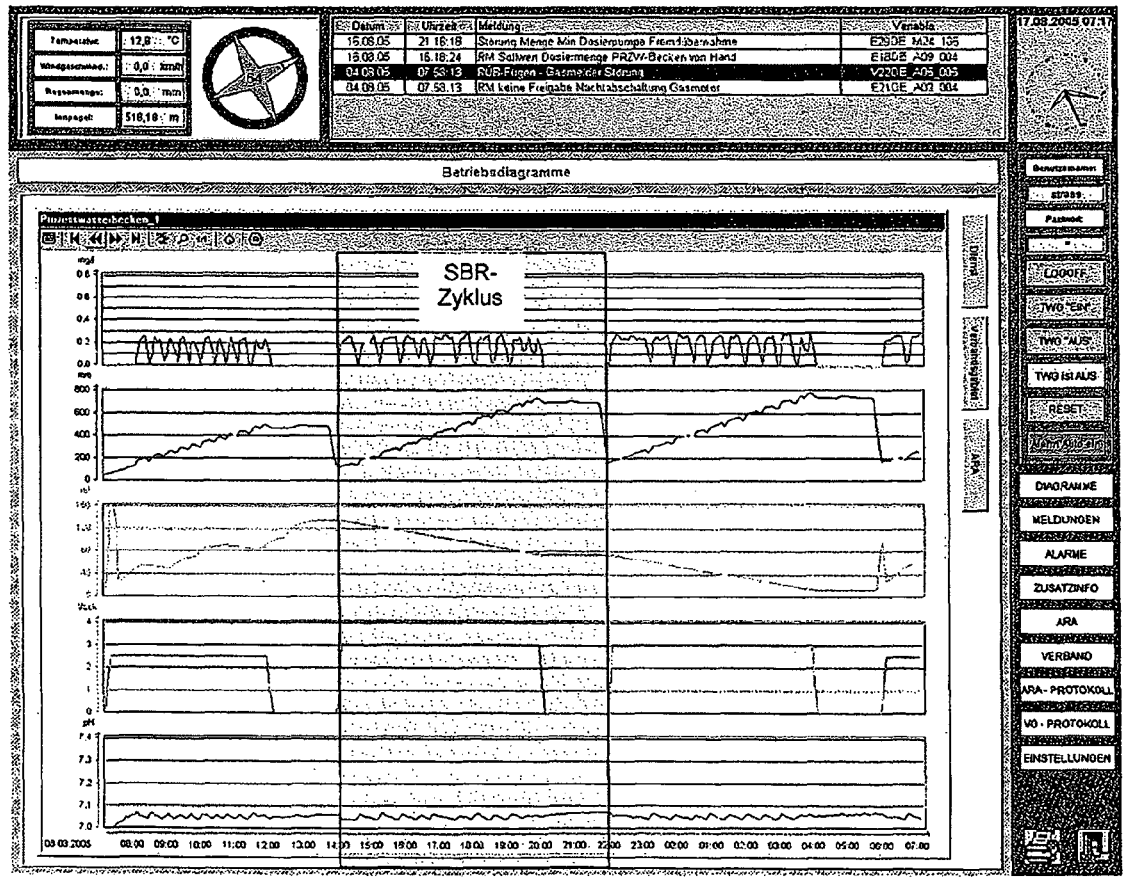
FIG. 3 is an operating diagram explaining the process sequence.

FIG. 3 shows a diagram in which diverse operational parameters are plotted over a time period of 24 hours. Starting at the bottom there is first the pH-value, then the intake of process water in l/s, then the stored volume of process water in m$^3$, above that the filling level in the reactor in mm, and finally the oxygen concentration in mg/l. The process sequence is subdivided into three SBR-cycles of 8 hours each. During the 6-hour aeration phase there is constant process water intake with a continuous rise in water level. The individual aeration intervals occur within a pH-interval of 0.01 between upper and lower target value. Actual fluctuations of the pH-value are slightly larger due to sluggish response. After the aeration phase the sludge settles and the clear water is drained down to the initial water level.

Figure 4:
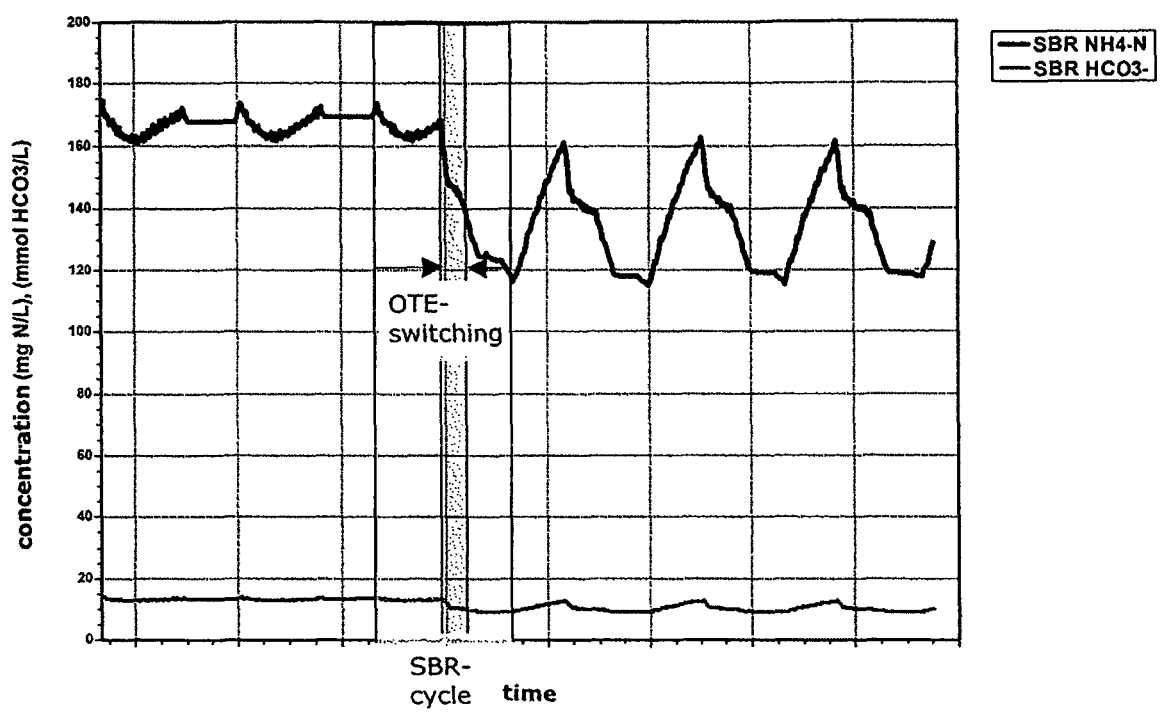
FIG. 4 is a diagram explaining the influence of coarse bubble aeration.

FIG. 4 shows the influences exerted on ammonium and bicarbonate concentration in the reactor, when fine bubble aeration is switched to coarse bubble aeration at the end of the reaction phase. This leads to intensified $CO_2$ stripping, with air volume and pH-control interval (here 7.25 to 7.26) remaining unchanged, and the concomitant acid binding is used for nitritation.

The method of the invention will permit the treating of waste water of high ammonium concentration with an extremely low input of resources while ensuring stable and robust operation.

The invention claimed is:

1. Method for the treatment of ammonium-containing waste water by means of a single sludge system in an SBR reactor, in which ammonium is converted to nitrite in a first reaction and ammonium and nitrite are converted into molecular nitrogen in a second reaction carried out in parallel, with oxygen concentration in the reactor being kept at a low level, comprising the step of controlling a pH-value of the system to assume a target value by controlled intermittent aeration, the fluctuation range of the pH-value being 0.05 at most, and $O_2$-concentration being kept within a range of 0.2 mg/l to 0.4 mg/l.

2. Method according to claim 1, comprising a step of lowering the pH to remove ammonia after the reaction phase.

3. Method according to claim 1, comprising the step of conducting coarse bubble aeration to remove ammonia after the reaction phase.

4. Method according to claim 1, wherein the target value of the pH-value, depending on the oxygen transfer efficiency OTE, lies in a range which is defined by the equation $$pH_s = 7.55 - 3*OTE/100 \pm 0.05.$$

5. Method according to claim 1, wherein a constant amount of incoming waste water is fed in above the water level during the aeration phase and is distributed over as large an area as possible.

6. Method according to claim 1, wherein sludge age is set at a value of at least 20 days and at most 35 days.

7. Method according to claim 1, wherein the fluctuation range of the pH-value is at most 0.02.

8. Method according to claim 1, wherein the $O_2$-concentration is kept within a range of 0.25 and 0.35 mg/l.

* * * * *